Oct. 13, 1942.  H. F. VICKERS ET AL  2,298,849
POWER TRANSMISSION
Filed March 30, 1939   3 Sheets-Sheet 1

INVENTORS
HARRY F. VICKERS &
KENNETH R. HERMAN
BY
Ralph L. Tweedale
ATTORNEY

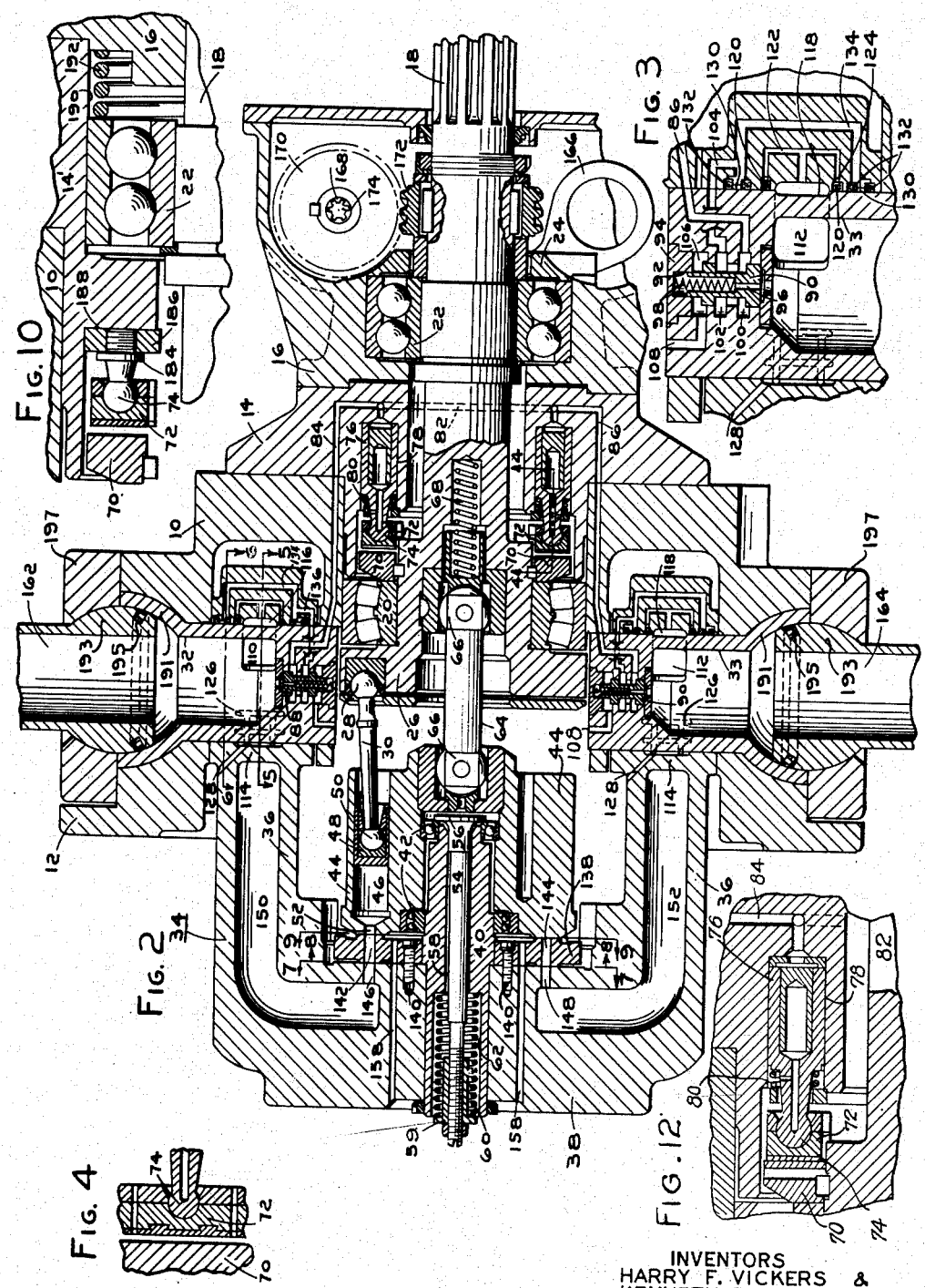

Oct. 13, 1942. H. F. VICKERS ET AL 2,298,849
POWER TRANSMISSION
Filed March 30, 1939 3 Sheets-Sheet 3
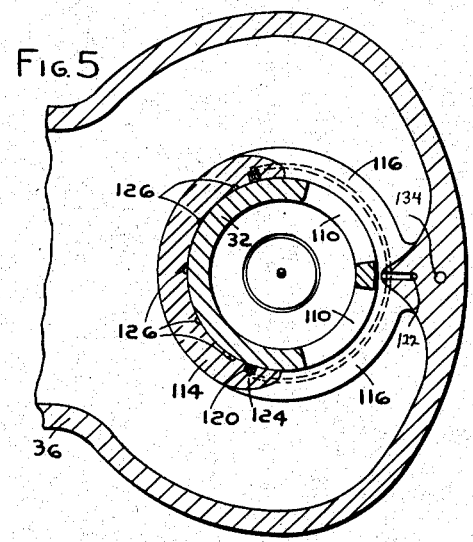
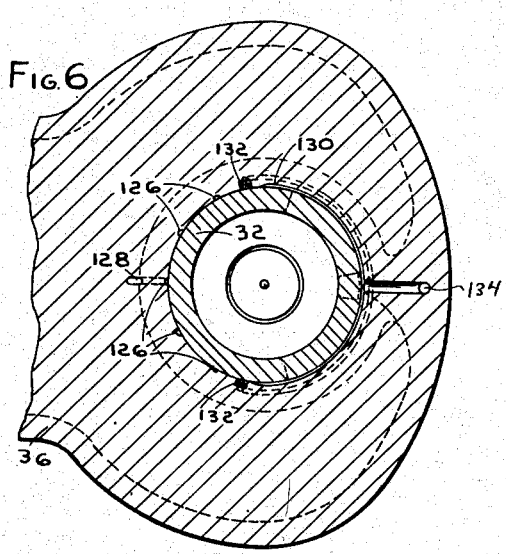
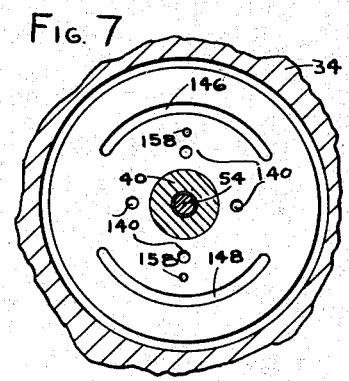
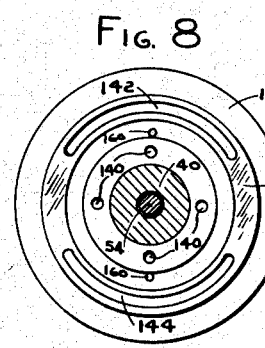
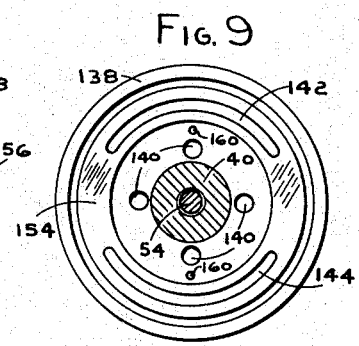
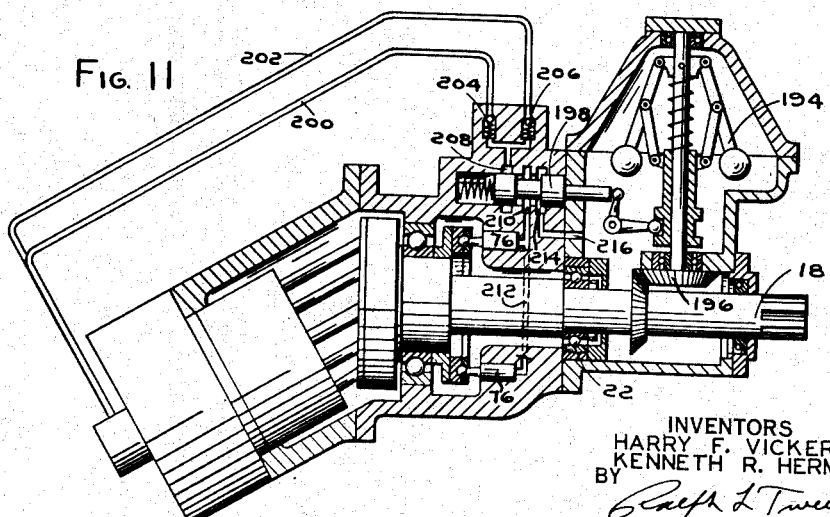
INVENTORS
HARRY F. VICKERS &
KENNETH R. HERMAN
BY
Ralph L. Tweedale
ATTORNEY Patented Oct. 13, 1942

2,298,849

UNITED STATES PATENT OFFICE 2,298,849

POWER TRANSMISSION

Harry F. Vickers and Kenneth R. Herman, Detroit, Mich., assignors to Vickers Incorporated, Detroit, Mich., a corporation of Michigan Application March 30, 1939, Serial No. 265,012

4 Claims. (Cl. 308—9)

This invention relates to power transmissions, particularly to those of the type comprising two or more fluid pressure energy translating devices, one of which may function as a pump and another as a fluid motor.

The present invention is particularly concerned with fluid pressure energy translating devices of the fixed or variable displacement type and is particularly applicable to those of the class wherein the load forces generated by fluid pressure within the device are carried by the drive shaft and casing largely in the axial direction with respect to the shaft. As an example of a pump or motor of this general class, reference may be had to the patent to Thoma, 1,931,969. In devices of this general character the axial thrust loads are substantially in direct proportion to the fluid pressure at which the device operates. The present tendency in the art is toward increasingly higher pressures which naturally imposes greater and greater loads on the thrust bearings of the device.

It is an object of the present invention, therefore, to provide an improved pump or motor construction having a greatly increased thrust bearing capacity at all speeds and permitting operation at higher pressures and speeds than heretofore have been possible.

It is also an object to provide a pump or motor of improved and more rugged, compact, and reliable construction, capable of satisfactory operation over a long useful life at extremely high pressures and high speeds.

Further objects and advantages of the present invention will be apparent from the following description, reference being had to the accompanying drawings wherein a preferred form of the present invention is clearly shown.

In the drawings:

Figure 2 is a cross section on line 2—2 of Figure 1.

Figure 3 is a fragmentary cross section on a larger scale showing a portion of the mechanism of Figure 2.

Figure 4 is a cross section on line 4—4 of Figure 2.

Figure 5 is a cross section on line 5—5 of Figure 2.

Figure 6 is a cross section on line 6—6 of Figure 2.

Figure 7 is a cross section on line 7—7 of Figure 2.

Figure 8 is a cross section on line 8—8 of Figure 2.

Figure 9 is a cross section on line 9—9 of Figure 2.

Figure 10 is a fragmentary view corresponding to a portion of Figure 2 showing a modified form of the present invention.

Figure 11 is a longitudinal cross section of a pump or motor embodying a further modification of the present invention.

Figure 12 is a fragmentary view corresponding to a portion of Figure 2 showing certain constructional details.

Figure 1:
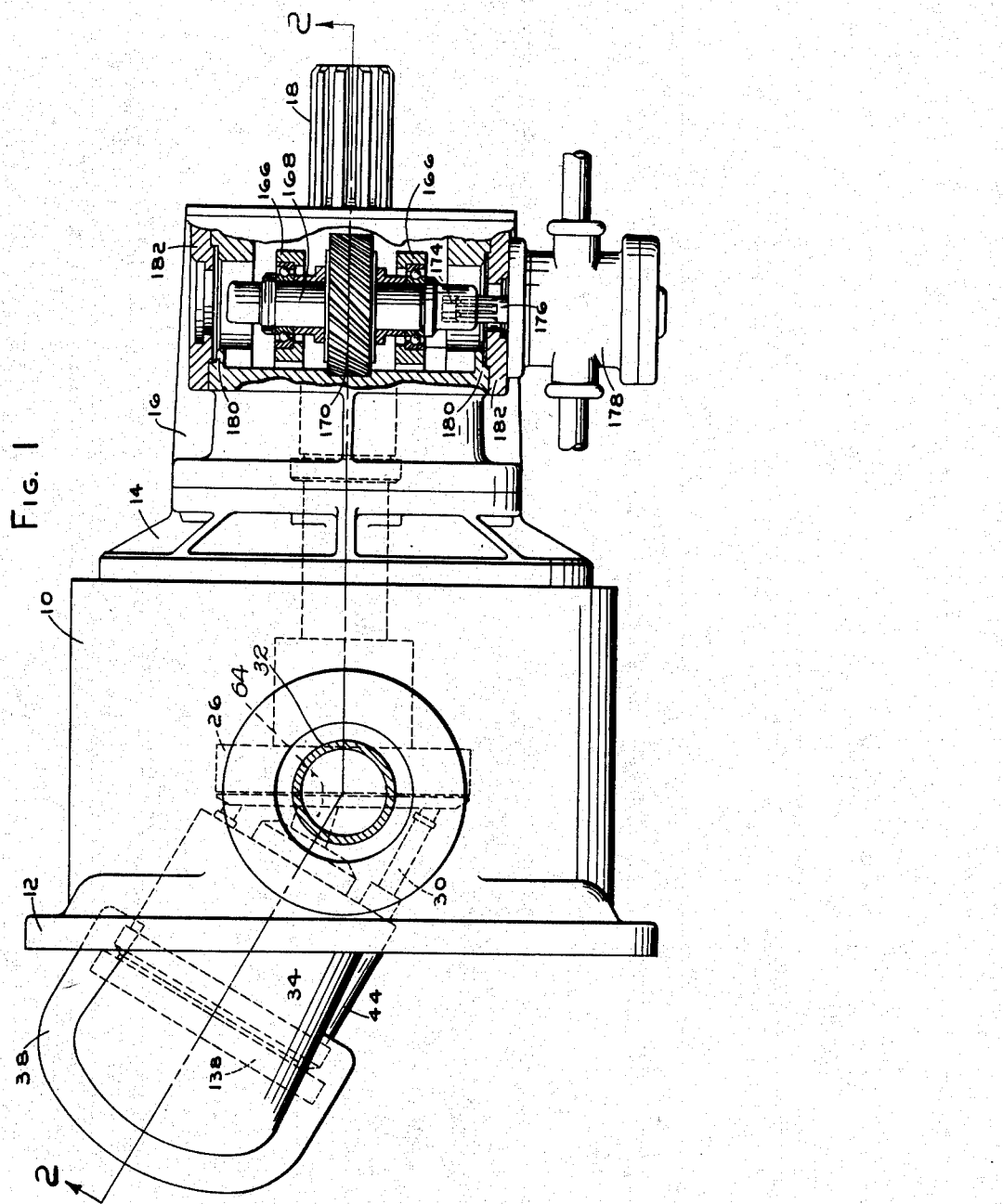
Figure 1 is a top view of a pump or motor incorporating a preferred form of the present invention.

Referring now to Figures 1 and 2 there is illustrated a pump of the variable displacement type having a generally cup-shaped main frame or casing member 10 having suitable flange means 12 for attachment to a support such as the wall of an oil tank. The right-hand end of the frame 10 is provided with a second frame member 14 secured thereto by suitable bolts not shown. A third frame member 16 is secured to the member 14 in a similar manner.

The main drive shaft 18 of the device is journalled on self-aligning, radial, anti-friction bearings 20 in the main frame 10 and on combined radial and thrust bearings 22 in the frame member 16. The outer race of bearing 20 is preferably slidable axially in the casing member 10, while the bearing 22 is rigidly secured in the frame member 16 against axial motion by means of the securing cap 24. At its left-hand end the shaft 18 is provided with a flange portion 26 which carries a plurality of ball and socket joints 28 by which connecting rods 30 are articulated to the flange 26.

Journalled on stationary hollow trunnions 32 and 33 in the main frame member 10 is a swinging yoke 34 having a pair of hollow arms 36 at opposite sides thereof and a valve plate portion generally designated as 38 intermediate the two arms 36. Journalled in the yoke 34 on a stub shaft 40 which is rigidly secured thereto and on anti-friction bearings 42 is a cylinder barrel 44. The bearings 42 are preferably axially slidable on the stub shaft 40.

The cylinder barrel 44 has a plurality of cylinder bores 46 in which pistons 48 are reciprocably mounted. The pistons are articulated to the connecting rods 30 by ball joints 50. At their left-hand ends each of the cylinder bores 46 is provided with a cylinder port 52 opening to the left-hand face of the barrel 44 and cooperating with the valve plate of the yoke 34 in the well-known manner. In order to yieldably retain the cylinder barrel 44 against the valve plate, a stem 54 having a mushroom-shaped head 56 at its right-hand end is slidably mounted in a bore 58 formed in the stub shaft 40, the mushroom head 56 abutting the inner race of the right-hand bearing 42. The left-hand portion of the stem 54 is threaded to adjustably carry a spring abutment 59. A spring 60 is mounted in an enlarged bore 62 at the left-hand end of the stub shaft 40 and serves to constantly urge the stem 54 and cylinder barrel 44 to the left.

The drive shaft 18 and the cylinder barrel 44 are connected together for conjoint rotation by means of a shaft 64 having universal joints 66 at its opposite ends which are connected respectively to the cylinder barrel 44 and the shaft 18. A light spring 68 urges the shaft 64 to the left to take up any lost motion in the axial direction inherent in the universal joints 66.

In order to safely carry far greater thrust loads than otherwise would be practical there is provided in addition to the ball thrust bearing 22 a Kingsbury type of thrust bearing comprising a hardened steel ring 70 keyed to the shaft 18 adjacent the bearing 20. A plurality of Kingsbury slipper pads 72 are mounted by means of ball joints 74 on a plurality of pistons 76 slidably mounted with limited travel in bores 78 formed in the frame member 14. The pistons 76 are urged to the right by light springs 80 so as to normally hold the slipper pads 72 out of contact with the bearing ring 70 when no fluid pressure exists in the right-hand end of the cylinders 78. Preferably the number of pistons and cylinders 76—78 corresponds to the number of cylinders and pistons 46—48, and the diameter of the former is a selected percentage of the diameter of the latter as will be later discussed.

The right-hand ends of the cylinders 78 are connected together by drilled conduits 82 in the frame 14 from which branch portions 84 and 86 extend through the frame member 10 to the hollow trunnions 32 and 33. The inner ends of the trunnions 32 and 33 are closed off from the interior of the casing 10 as shown and each carries a spring-loaded, pressure responsive, four-way valve 88 and 90.

The construction of these valves is similar and that of the valve 90 is shown more clearly in Figure 3. The lower end of the valve 90 is of a somewhat larger diameter than the upper end which slides in a bore 92 in a cap 94. A central passage 96 through the valve places the bore 92 in communication with the hollow interior of the trunnion 33 so that a differential area of the valve 90 is exposed to the pressure in the trunnion 33. A spring 98 opposes this pressure. The conduit 86 extends into the closed end of the trunnion 33 and connects with a port 100. A port 102 connects with a conduit 104 for a purpose later to be described. A port 106 connects by a conduit 108 with the interior of the casing member 10.

It will be seen that in the position of the valve 90 shown in Figures 2 and 3, that is, when the pressure in trunnion 33 is not sufficiently higher than that within the casing 10 to overcome the spring 98, ports 100 and 102 are connected together and are cut off from the trunnion 33 and conduit 108 respectively. When the pressure in trunnion 33 rises sufficiently to overcome spring 98, valve 90 moves upwardly cutting off port 100 from port 102 and placing port 100 in communication with the interior of trunnion 33 as well as connecting port 102 with port 106. Thus pressure oil from trunnion 33 may be admitted to the conduit 86 and distributed through conduits 82 to the various cylinders 78 urging the pistons 76 to the left and bringing the slipper pads 72 into contact with the bearing ring 70. Normally only one of the valves 88 or 90 is open at one time so that pressure oil transmitted through conduit 86, for example, cannot escape to the opposite trunnion 32 through the valve 88.

The bearing construction at the trunnions 32 and 33 includes an improved means for balancing the radial loads on the bearing hydraulically and for insuring that no loads are transmitted to the yoke arms 36 in a direction axially of the trunnions. For this purpose each of the trunnions is provided with a pair of radially opening ports 110 and 112 which extend through an arc somewhat less than 180 degrees facing to the right in Figure 1. The disposition of these ports is illustrated in Figure 5. The arms 36 are provided with bearing portions 114 which surround the trunnions. There is formed in each of these bearing portions a pair of ports 116 and 118 which register with the ports 110 and 112. The ports 116 and 118 extend through an arc of approximately 180 degrees.

Around the periphery of the ports 116 and 118 there is provided a flexible packing member which is formed as an endless band 120 of generally rectangular shape with rounded corners to completely encompass the ports 116 and 118. This packing may be made of a suitable material such as leather or Neoprene. The rear faces of the packings 120 are in communication with their respective ports 116—118 through drilled passages 122, a groove 124 being provided in the packing receiving recess for distributing the oil pressure around the entire back face of the packing 120. The projected area enclosed by the packing 120 is chosen so that the radial force due to fluid pressure tending to move the arm 36 to the right in Figure 1 is equal to that portion of the load imposed on the trunnion 32 or 33 by the thrust of the pistons 48.

Diametrically opposite the ports 110 and 112 the bearing portion 114 is provided with pressure relieving grooves 126 which cover a generally comparable area to that of the ports 110 or 112 and which communicate by bores 128 with the interior of the casing member 10. To either side of the ports 116 and 118 in the bearing portions 114 there are provided in each bearing portion a pair of balancing grooves 130 (see Figures 3 and 6). These grooves 130 are surrounded with peripheral packing members 132 similar in construction to the packing members 120. Suitable drilled conduits 134 connect the balancing grooves 130 and the back face of packings 132 with the conduit 104 at trunnion 33 and with a similar conduit 136 at trunnion 32. The area enclosed by the two packing members 132 at either trunnion 32 or 33 is preferably so chosen that the fluid pressure force exerted therein tending to urge the arm 36 to the right in Figure 2 is equal to the portion of the piston thrust load carried by that trunnion when the other trunnion is on the pressure side of the machine.

It will be understood, of course, that the trunnion load produced by the thrust of pistons 48 is not equal on both trunnions. Thus in Figure 2, if we assume that the trunnion 32 is under pressure and the trunnion 33 is not, this means that the pistons 48 which are in the top half of Figure 1 are subject to pressure while those at the bottom half of Figure 1 are not. Thus the center of pressure of the total piston thrust is somewhat above the axis of stub shaft 40, imposing a greater load on trunnion 32 than on trunnion 33. The areas of the balancing grooves 130 are preferably chosen so as to carry the approximate proportion of the piston thrust which is exerted on the trunnion not under pressure.

Due to the inherent constructional requirements of the yoke 34, it is preferable to make this part by casting, and in order to provide a more wear-resisting material than can be readily cast, the valve plate portion 38 of the yoke 34 carries a removable wearing plate 138 which is secured to the right-hand face of the portion 38 by bolts 140. The plate 138 carries the usual pair of arcuate valve ports 142 and 144 which cooperate with the cylinder ports 52 in the well-known manner. These ports register with corresponding ports 146 and 148 formed in the valve plate portion 38 of yoke 34 which communicate with passages 150 and 152 leading to the trunnion bearings 114.

On its right-hand face the plate 138 is provided with the usual raised annular pressure surface 154 (Figure 9). On its left-hand face the plate 138 is provided with a similar raised annular surface 156 having a somewhat smaller outer diameter and a somewhat larger inner diameter than the surface 154. In order to insure against hydraulic pressures tending to separate the plate 138 from the yoke 34, the annular space within the raised contact portion 156 is connected to the interior of the casing by drain holes 158 formed in the yoke 34. Suitable drain holes 160 extend through the plate 138 to also drain the annular space inside the raised contact face 154.

The general operation of the structure thus far described is well-known in the art. Briefly stated, rotation of the shaft 18 and cylinder barrel 44 causes the pistons 48 to be reciprocated in the bores 46 through a stroke depending upon the angular setting of the yoke 34 relative to the shaft 18. With the yoke 34 in neutral position, that is, with the barrel 44 aligned with shaft 18, the pistons will not be reciprocated at all and no fluid will be pumped, whereas if the yoke be swung to its limit of movement as in Figure 1, the piston stroke will be at a maximum causing oil to be delivered through the ports 52 into the valve plate port 142, for example, and delivered through passage 150 and trunnion 32 to the main line conduit 162. As each cylinder comes into register with the opposite valve plate port 144, fluid is drawn in therethrough from the passage 152 and main line conduit 164. In thus delivering oil against a high pressure head, severe thrust loads are imposed on the flange 26 and shaft 18 which must be carried by the thrust bearings of the device.

It is a well-known characteristic of ball bearings that their load capacity decreases as the speed of operation increases. It is also a characteristic of the Kingsbury type of thrust bearing that its load capacity increases as the speed of operation increases. Accordingly, the springs 80 at the pistons 76 may be selected so as to have sufficient force to hold the pistons 76 to the right at any pressure below the safe thrust capacity of the ball bearings 22 at maximum operating speed. Accordingly, if we assume, for example, that the yoke is adjusted so that trunnion 33 is the pressure conduit and oil is being delivered therethrough to the main line 164, it will be seen that the valve 90 will move upwardly as soon as any significant pressure resistance is built up in the line 164. This places the port 100 in communication with the interior of trunnion 33 admitting main line pressure to conduit 86 where it is distributed to all of the cylinders 78. This oil pressure is also transmitted through conduit 84 and valve 88 which is in its upper position to the conduit 136 and to the auxiliary balancing grooves 130 located at the trunnion 32. As soon as the pressure in line 164 builds up sufficiently to overcome springs 80, pistons 76 move to the left bringing the slipper pads 72 into operating engagement with the bearing ring 70. From this point on a portion of the thrust load is thus carried on the Kingsbury bearing.

For this purpose the diameter of cylinders 78 is preferably selected so as to have an area relation with respect to pistons 48 which is the same as the desired load relation between the Kingsbury thrust bearing and the ball thrust bearing. Obviously the exact percentage of load which it may be desired to carry on the Kingsbury type of bearing is susceptible of wide range of choice depending upon such design considerations as relative cost and space required for the ball and Kingsbury type bearings.

Since at a given pressure the total thrust load varies as the cosine of the angle between the barrel and shaft, the areas may be selected so that at great angles the pistons 76 will exert more force on ring 70 to the left than pistons 48 exert thereon toward the right. In such case the ball bearing 22 is actually loaded with a negative thrust. With such an area relation, then, this negative thrust on the ball bearings will become smaller as the angle of the yoke is decreased (pressure remaining constant) until a point is reached where the Kingsbury pads carry exactly the full thrust. As the angle is further decreased the ball bearing 22 becomes positively loaded, this positive load increasing as the angle is further decreased. Preferably the piston areas are so chosen that the maximum negative load on ball bearing 22 is equal to the maximum positive load.

It will be seen that if desired the springs 80 may be omitted thus enabling the Kingsbury bearing to carry a portion of the load at all times. It is preferred to use these springs, however, since they serve to reduce frictional drag at low loads and thus improve efficiency at low power outputs. In either event the pistons 76 serve to automatically maintain a predetermined portion of the load on the Kingsbury bearing at any yoke angle over the full pressure range and independently of deflection or misfitting of the parts. In addition the mounting of the pads 72 on ball joints insures proper bearing on the ring 70 even though the latter becomes deflected into a dished shape under heavy loads.

The bearing loads at the trunnions 32 and 33 are hydraulically balanced so that the yoke is free swinging. In this connection, if we still consider the trunnion 33 as being under pressure, it will be seen that the ports 112 and 118 balance the radial load imposed on trunnion 33 while the auxiliary balancing grooves 130 at trunnion 32 balance the smaller load on that trunnion. It will be noted that the auxiliary balancing grooves are supplied with pressure from the opposite trunnion 33 rather than with the low side pressure existing in trunnion 32. Due to the fact that the trunnions 32 and 33 are rigidly secured to the casing member 10 and further due to the fact that the arms 36 embrace the trunnions over equal areas at the top and bottom of each arm in Figure 2, there is no force transmitted to the arms 36 in a direction axially of the trunnions. In larger size machines where this construction is not provided, it will be seen that a fluid pressure force would be exerted on the yoke as a whole equal to the cross section of the pressure conduit 164 multiplied by the operating pressure, and this force would be transmitted through the yoke to the casing at the opposite trunnion 32. In the present construction this force, due to hydraulic pressure existing in the main line 164, for example, is carried directly by the casing itself, thus further reducing the frictional resistance to turning of the yoke 34.

The conduits 162 and 164 are preferably provided with ball and socket connections as illustrated, for providing greater ease in making the necessary pipe connections in large size machines and permitting easy compensation for errors in alignment in rigging up pipe lines. For this purpose the trunnions 32 and 33 are provided with bell portions 191 for the reception of the spherical enlargements 193 formed in the pipes 162 and 164. These enlargements are provided with grooves in which are positioned sealing rings 195 having a generally U-shaped cross section and formed of Neoprene. The rings 195 are preferably formed so that their open edges will be forced toward one another when the joint is assembled thereby insuring a firm edge contact with the bottom wall of the groove and with the bell portions 191. Caps 197 are provided with spherical sockets adapted to receive the enlargements 193 and are secured to casing 10 by suitable bolts not shown. This construction provides a tight seal while permitting angular adjustments of the pipe connections to be made as desired.

It is frequently desirable to provide a plurality of auxiliary pumps or other auxiliary devices in connection with a large pump or motor of the character described. For this purpose the casing member 16 is provided with a bell-like portion at its right-hand end. Journalled in brackets 166 are a pair of transverse shafts 168 positioned above and below the main shaft 18. At their mid portion the shafts 168 each have keyed thereto helical gears 170. These gears mesh with a helical pinion or worm 172 keyed to the main shaft 18. The ends of the shafts 168 are provided with splined bores 174 for attachment to the drive shaft such as 176 of an auxiliary pump indicated at 178 in Figure 1. The casing portion 16 is provided with four circular flange portions 180 on which mounting flanges 182 are secured by suitable bolts, not shown, to form mounting flanges for the auxiliary pumps which are driven by the shafts 168. It will be seen that this construction provides a compact means for driving as many as four auxiliary devices from the main drive shaft 18.

Referring now to Figure 10 there is illustrated a modified form of the invention wherein the Kingsbury bearings are brought into and out of action by the thrust of the pistons 48 themselves. In this figure only those portions of the mechanism which are modified for this purpose are illustrated.

The bearing ring 70 is keyed to the shaft 18 as in the previously described form of the invention. The Kingsbury slipper pads 72 are carried by ball joints 74 on studs 184 which are rigidly secured to a ring 186. The latter is positioned on a shoulder 188 formed in the second casing member 14', whereby the slipper pads 72 are rigidly mounted with respect to movement axially of the shaft 18.

The thrust bearing 22 is immovably secured to the shaft 18 as before but is slidably mounted in a bore 190 in the casing member 14'. A heavy spring 192 urges the outer race of the bearing 22 to the left, thus carrying the entire shaft including the flange 26 and the connecting rods 30 and pistons 48 slightly to the left and holding the bearing ring 70 out of contact with the pads 72. The universal joints 66 (see Figure 1) normally permit a limited degree of axial movement of this character.

When the pressure in the device builds up sufficiently to overcome the force of spring 192, the entire shaft assembly is moved back to the right permitting the bearing ring 70 to contact the slipper pads 72 and thus bring the Kingsbury bearing into operation to carry its portion of the thrust load.

In the modified form of the invention illustrated in Figure 11, which incidentally shows a fixed displacement machine rather than a variable displacement one, the control of the Kingsbury pistons 76 is exercised through a speed responsive governor 194 driven by bevel gearing 196 from the shaft 18. As the speed of the shaft 18 increases the governor operates a valve 198 shifting the latter to the left to connect the pistons 76 with the main pressure line. For this purpose conduits 200 and 202 extend from the two arcuate valve ports of the device to a pair of check valves 204 and 206. The latter lead to a port 208 of the valve 198 so that one of the valve ports which happens to be under pressure is always in communication with the port 208. A port 210 of the valve 198 connects by a conduit 212 with the Kingsbury pistons 76. A third port 214 is connected to the interior of the casing of the device by a passage 216.

With the valve 198 in the position illustrated, that is, at slow speeds of the shaft 18, the Kingsbury pistons 76 are connected to exhaust through passage 212, ports 210 and 214, and conduit 216. Thus the entire thrust load is carried on the thrust bearing 22. When the speed rises beyond a predetermined point, the valve 198 is shifted to the left admitting pressure from the main line to the port 208 and through port 210 and conduit 212 to the Kingsbury pistons, thus bringing the Kingsbury bearings into operation.

While the form of embodiment of the invention as herein disclosed constitutes a preferred form, it is to be understood that other forms might be adopted, all coming within the scope of the claims which follow.

What is claimed is as follows:

1. In a pump or motor device the combination of a stationary frame member and a rotary driving member and pumping or propelling mechanism of the type imposing an axial thrust between said members in proportion to the operating pressure of the device, an anti-friction thrust bearing between the two members and having sufficient load capacity to carry only a portion of the thrust at full load and speed, a slipper type thrust bearing between the two members, and means responsive to changes in operating pressure in the device for bringing one of the bearings into and out of operation.

2. In a pump or motor device the combination of a stationary frame member and a rotary driving member and pumping or propelling mechanism of the type imposing an axial thrust between said members in proportion to the operating pressure of the device, an anti-friction thrust bearing between the two members and having sufficient load capacity to carry only a portion of the thrust at full load and speed, a slipper type thrust bearing between the two members, and means responsive to an increase in operating pressure in the device for transferring the load from the anti-friction bearing to the slipper type bearing.

3. In a thrust bearing assembly for operation over a wide range of load and speed the combination with a stationary load receiving member and a rotary load imposing member of an anti-friction bearing between the two members having sufficient capacity to carry only a portion of the thrust at full load and speed, a slipper type bearing between the two members, and means responsive to changes in load for bringing one of the bearings into and out of operation independently of the speed of rotation.

4. In a thrust bearing assembly for operation over a wide range of load and speed the combination with a stationary load receiving member and a rotary load imposing member of an anti-friction bearing between the two members having sufficient capacity to carry only a portion of the thrust at full load and speed, and a slipper type bearing between the two members, said bearings being mounted to carry the load in different relative proportions at different total loads independently of the speed of rotation.

HARRY F. VICKERS.
KENNETH R. HERMAN.